(12) United States Patent
Larch

(10) Patent No.: US 12,194,532 B2
(45) Date of Patent: Jan. 14, 2025

(54) METHOD FOR PRODUCING A LIGHT-WEIGHT PRESSURE TANK AND LIGHT-WEIGHT PRESSURE TANK

(71) Applicant: Sasha Larch, Neusaess (DE)

(72) Inventor: Sascha Larch, Neusaess (DE)

( * ) Notice: Subject to any disclaimer, the term of this patent is extended or adjusted under 35 U.S.C. 154(b) by 852 days.

(21) Appl. No.: 17/176,415

(22) Filed: Feb. 16, 2021

(65) Prior Publication Data

US 2021/0197274 A1 Jul. 1, 2021

Related U.S. Application Data

(63) Continuation of application No. PCT/EP2019/072247, filed on Aug. 20, 2019.

(30) Foreign Application Priority Data

Aug. 21, 2018 (DE) .................... DE102018120291.1
Aug. 21, 2018 (DE) .................... DE102018120293.8

(51) Int. Cl.
| | | |
|---|---|---|
| *B22D 23/00* | (2006.01) | |
| *B22F 10/20* | (2021.01) | |
| *B22F 10/22* | (2021.01) | |
| *B22F 10/64* | (2021.01) | |
| *B22F 10/66* | (2021.01) | |

(Continued)

(52) U.S. Cl.
CPC ............ *B22F 10/66* (2021.01); *B22D 23/003* (2013.01); *B22F 10/20* (2021.01); *B22F 10/22* (2021.01); *B22F 10/64* (2021.01); *B33Y 10/00* (2014.12); *B33Y 40/20* (2020.01); *B33Y 80/00* (2014.12); *F17C 13/008* (2013.01); *F17C 2201/0123* (2013.01); *F17C 2201/0128* (2013.01); *F17C 2203/0617* (2013.01); *F17C 2203/0636* (2013.01); *F17C 2203/0663* (2013.01); *F17C 2209/2109* (2013.01); *F17C 2209/2181* (2013.01); *F17C 2209/221* (2013.01); *F17C 2209/232* (2013.01); *F17C 2209/234* (2013.01); *F17C 2221/011* (2013.01);

(Continued)

(58) Field of Classification Search
CPC ....... B22D 23/00; B22D 23/003; B22F 10/22; B22F 10/64; B22F 10/66
USPC ..................................................... 164/19, 46
See application file for complete search history.

(56) References Cited

U.S. PATENT DOCUMENTS 5,085,343 A 2/1992 Scarr
9,884,369 B2 2/2018 Lancaster Larocque
(Continued)

FOREIGN PATENT DOCUMENTS

DE 102006044612 A1 3/2008
DE 102010060362 A1 5/2012
(Continued)

*Primary Examiner* — Kevin P Kerns
(74) *Attorney, Agent, or Firm* — Von Rohrscheldt Patents

(57) ABSTRACT

A method for producing a light-weight pressure tank with a light-weight pressure container from a metal material, the light weight pressure container including at least one polar or equatorial attachment element and a container wall connected to the at least one polar or equatorial attachment element, wherein at least the container wall is formed integrally in one piece with the at least one polar or equatorial attachment element by additive manufacturing by a thermal spraying method by applying the metal material to a convex or concave mold surface of a cambered formwork mold by a spray jet through at least one spray nozzle.

9 Claims, 3 Drawing Sheets

(51) Int. Cl.
*B33Y 10/00* (2015.01)
*B33Y 40/20* (2020.01)
*B33Y 80/00* (2015.01)
*F17C 13/00* (2006.01)

(52) U.S. Cl.
CPC .. *F17C 2221/012* (2013.01); *F17C 2260/012* (2013.01); *F17C 2260/013* (2013.01); *F17C 2270/0194* (2013.01); *F17C 2270/0197* (2013.01)

(56) References Cited

U.S. PATENT DOCUMENTS

| | | | |
|---|---|---|---|
| 2004/0091617 A1* | 5/2004 | Peter et al. | B05D 1/002 |
| | | | 118/300 |
| 2005/0084701 A1 | 4/2005 | Slattery | |
| 2015/0246394 A1 | 9/2015 | Lancaster Larocque | |
| 2018/0229863 A1 | 8/2018 | Veto et al. | |

FOREIGN PATENT DOCUMENTS

| | | |
|---|---|---|
| DE | 102013216439 A1 | 11/2014 |
| DE | 102015017026 A1 | 7/2017 |
| EP | 3333474 A1 | 6/2018 |
| FR | 3025491 A1 | 3/2016 |
| FR | 3059578 A1 | 6/2018 |
| WO | WO2009/109016 A1 | 9/2009 |
| WO | WO2011017752 A1 | 2/2011 |
| WO | WO2011047645 A1 | 4/2011 |
| WO | WO2014116254 A1 | 7/2014 |
| WO | WO2017114584 A1 | 7/2017 |

* cited by examiner

METHOD FOR PRODUCING A LIGHT-WEIGHT PRESSURE TANK AND LIGHT-WEIGHT PRESSURE TANK

RELATED APPLICATIONS

This application is a continuation of International application PCT PCT/EP2019/072247 filed on Aug. 20, 2019 claiming priority from German patent application DE 10 2018 120 291.1 filed on Aug. 21, 2018 and German patent application DE 10 2018 120 293.8 filed on Aug. 21, 2018, all of which are incorporated in their entirety by this reference.

FIELD OF THE INVENTION

The instant invention relates to a method for producing a light-weight pressure tank. The invention also relates to a light weight pressure tank produced by the method. The invention relates in particular to a method for producing a satellite, spacecraft or rocket tank and to a satellite, spacecraft or rocket tank produced by the method. The invention, however, is not limited to these applications but can certainly also be used for stationary tanks or in land vehicles, watercraft or aircraft for light-weight pressure tanks that can be used for storing compressed gases like e.g. hydrogen.

BACKGROUND OF THE INVENTION

Pressure containers that are configured to sustain a high interior pressure relative to a low exterior pressure are well known in the art. Typically, these pressure containers are made from metal plates that are either made from two half spheres welded together or that include a cylindrical container section that is welded together with dome shaped container bases. The dome shaped container bases are typically made from triangular or trapezoid metal plates that are bent and welded together into a three dimensional shape. Quality of weld seams is critical in pressure containers that include weld seams, since it has to be avoided at any cost that a pressurized pressure container tears at possible weak spots at the weld seams and explodes. Therefore, the weld seams have to be fabricated with great diligence and the pressure container has to be subjected to pressure tests in recurrent intervals.

Light-weight pressure containers that are used e.g. for fuel tanks in space applications are particularly challenging. In these tanks weight has to be reduced to a minimum so that the container is typically produced with a very thin container wall and optionally with a support structure connected with the thin container wall on the container inside or the container outside. Therefore, thick wall material is milled on the inside of the container and enough material is removed so that a thin wall skin with stiffeners like e.g. longitudinal stringers or bulk heads that adjoin on the inside or the outside is formed. It is evident that this fabrication method is quite time consuming and expensive. Also, the triangular or trapezoid segments for fabricating the respective container floor are milled from solid material in this manner. The component thus obtained are then formed into three dimensional cambered triangles or trapezoids by bead blasting and welded into the dome shaped container base thereafter. Areas where welds are provided need to be kept at a higher wall thickness during chipping fabrication in order to facilitate welding and to compensate the reduced material strength in the weld. This locally increased wall thickness increases mass and weight of the pressure container.

Welding the individual components is typically performed by tungsten inert gas welding or friction stir welding which requires special welding equipment that has to be adapted to a geometry and diameter of the container bases to be welded. This special equipment is quite expensive.

Known methods for producing light-weight pressure containers in particular rocket tanks therefore have the disadvantage that producing individual components including the cylindrical tank body by milling from solid material and welding the components together is quite time consuming and expensive. Furthermore, the individual components have to have a higher wall thickness at the weld compared to a wall thickness that is required distal from the weld. This fabrication method requires very large equipment that has to be individually produced for a particular pressure container type. Therefore, the cost of fabrication of pressure containers of this type, e.g. rocket tanks is extremely high and a very long lead time is required for designing and fabricating special welding equipment before a prototype of a tank design can be produced.

Thermal spaying methods like e.g. cold gas spraying is typically used for coating surfaces. A cold gas spraying method for coating surfaces where gas is first compressed and heated and subsequently accelerated by decompressing in a nozzle so that particles that are introduced into the gas jet are impinged onto a previously heated substrate is known from DE 10 1006 044 612 A1.

It is known from WO 2009/109016A1 to use a cold gas spraying method for fabricating tubes wherein material particles that subsequently form the tube are sprayed onto a carrier element to produce the tube. Subsequently the carrier element is removed from the tube.

DE 10 2010 060 362 A1 discloses an inclination of a spray nozzle when producing a tube through a thermal spray method, thus adjusting the spray angle relative to the surface to be coated and thus adjusting and adhesion tensile strength of the material layer on its base. The spray angle is selected so that adhesion is generated that is sufficient to hold the coating material at the carrier element and small enough so that the tube can be disengaged from the carrier element after completion without expensive method steps.

DE 10 2015 017 026 A1 describes a method for producing pressure containers without forming tools wherein the pressure container is entirely or partially made from metal using a sinter or compressed powder method. Thus, metal powder that is contained in a metal powder storage is melted in layers by electron beam melting or by selective laser beam melting. Alternatively, the pressure container can be produced by multi-jet modeling from liquid synthetic material, wherein the synthetic material that exits from the nozzle and forms a shape and is cured by an energy source immediately after exiting from the nozzle. It is appreciated that this method works without a mold.

DE 10 2013 126 439 A1 shows and describes a method for producing a shell shaped component by cold gas spraying. Thus, initially a so-called start structure is provided that is configured annular. This start structure is either provided in a form of a flange ring with a central opening or the start structure is provided by cold gas spraying on a flat table. Thus, the cold gas jet impacts the upper surface of the table that forms an essentially radial plane with respect to the dome shaped body that is to be produced. The start structure fabricated this way includes a surface that is oriented away from the table wherein the surface is parallel to a surface of the table and thus forms a radial plane of the dome shaped body whose walls are subsequently produced on the surface. Also the other alternative of the start structure forms a flat plane which subsequently forms an essentially radial surface of the dome shaped body subsequently produced.

Forming the wall of the dome shaped body starts by applying material through a cold gas jet that includes particles of the material onto the support body or onto its upper start surface that extends in the radial direction of the dome shaped body to be produced. Thus, a spherical support body is placed at an edge of the opening that is enveloped by the start structure so that the spherical support body that is guided by a programmed robotic arm dynamically forms an inner mold for the dome shaped body to be produced. Also the cold gas spray nozzle from which the cold gas jet exits is attached at a robotic arm and is guided according to a program. The cold gas spray nozzle is thus oriented so that the cold gas jet is initially oriented towards the start surface and then always oriented towards an edge of the wall that is being produced. The cold gas jet thus impacts the edge of the wall that is being produced precisely at a 90-degree angle. This angle however can vary slightly but it has to be prevented that particles are deposited on the surface of the support body.

EP 3333474A1 shows and describes a thin wall container with an upper dome shaped cover, a lower dome shaped cover and a center cylindrical tubular section, wherein the covers are connected with the cylindrical tubular section, e.g. welded together. The dome shaped cover as well as the cylindrical section are made from a thin enveloping skin that is provided with reinforcement ribs on an inside by additive manufacturing. The container can either be produced in its entirety by additive manufacturing or the dome shaped covers can be welded together with the cylindrical tubular section.

WO2017114584A1 describes a method for producing wall elements of a housing of pressure containers in this method the wall of a pressure container is formed by a 3D printing method from a metal powder, wherein a spray nozzle that ejects the metal powder moves back and forth in a direction of the wall section thus in a radial direction and thus builds up the wall of the pressure container in layers. In order to prevent a deformation of a protruding wall section during cooling of the wall section when building up the wall of a pressure container in particular in a critical portion of the geometry where an applied wall layer laterally protrudes beyond the previously produced wall layer in the wall thickness direction and in order to avoid using a mold body a layer thickness is increased compared to the previously applied layers which helps to achieve tension free material cooling of the metal material that is being applied.

BRIEF SUMMARY OF THE INVENTION

Thus, it is an object of the invention to provide a method that allows to produce a light-weight pressure tank with a light-weight pressure container in a faster and more economical manner.

The object is achieved by a method for producing a light-weight pressure tank with a light-weight pressure container from a metal material, the light weight pressure container including at least one polar or equatorial attachment element and a container wall connected to the at least one polar or equatorial attachment element, wherein at least the container wall is formed integrally in one piece with the at least one polar or equatorial attachment element by additive manufacturing by a thermal spraying method by applying the metal material to a convex or concave mold surface of a cambered formwork mold forming a mold body by a spray jet through at least one spray nozzle, the method including the steps providing the at least one polar or equatorial attachment element that includes at least one attachment section and at least one container wall section, wherein the at least one container wall section includes at least one circumferential edge portion whose wall thickness tapers towards a free circumferential edge and forms a contact surface that extends at a slant angle in a cross section of the at least one container wall section; positioning the at least one polar or equatorial attachment element at or on the concave or convex mold surface of the cambered formwork mold so that the contact surface is oriented away from the convex or concave mold surface; applying the metal material by the spray jet through the at least one spray nozzle by the thermal spraying method to the contact surface of the attachment element and to the convex or concave mold surface of the cambered formwork mold and forming a cambered container wall element that is connected seamlessly to the contact surface and that is integrally configured in one piece with the container wall section; and separating a unit including the at least one attachment element and the container wall element from the cambered formwork mold.

Fabrication is performed in particular by a cold gas spraying method. Applying the metal material to the mold surface by the spray jet through the spray nozzle can be performed in all embodiments of the method according to the invention in a single method step or advantageously in several consecutive method steps in layers. Thus, the thickness of the sprayed-on metal material layer is a function of a movement speed of the spraying device.

The formwork mold can be an outer mold or an inner mold which is configured as a lost mold for an integrally fabricated spherical light-weight pressure container wherein the mold is e.g., melted out of the light-weight pressure container after the fabrication process. Advantageously a surface of the formwork mold is provided with a release agent which facilitates subsequent disengagement of the work piece from the formwork mold.

The light weight pressure container including the at least one attachment element and the container wall element can thus be produced integrally in one piece seamless through the thermal spraying method. Alternatively it is also possible according to the invention to initially produce the attachment element or the container wall element by the thermal spraying method and to form the respective other element, the container wall element or the attachment element thereon by the thermal spraying method. The attachment element can also be formed in advance in a conventional manner by forging, turning or milling and the container wall element can then be formed thereon by the thermal spraying method.

Advantages

Due to the additive fabrication method according to the invention at least of the container wall a fabrication of the pressure container that is fabricated so far in several steps from two half shells that are initially welded with the at least one attachment element and then welded with each other or welded with an intermediate wall element can be simplified significantly. Due to the integral fabrication the weld seams can be omitted which allows for a continuously thin wall because no thickened wall portions have to be provided that would otherwise be required for the welding process. Therefore, a mass of the light-weight pressure tank produced according to the invention is less than a mass of a conventionally produced pressure tank. Furthermore a risk of weld seams tearing under pressure loading and alternating temperature induced stresses. Fabrication cost and fabrication time are thus substantially reduced over the prior art when using the method according to the invention.

Additional advantageous features of the method according to the invention can be derived from the dependent claims.

Advantageously the light-weight pressure container includes a spherical or substantially spherical body that is produced seamless by applying the metal material with the spray jet through at least one spray nozzle onto the convex outer surface or concave inner surface of the spherical or substantially spherical form work mold that forms the form surface. Spherical or substantially spherical tanks of this type are particularly suitable for storing gaseous or liquified media under high pressure, e.g. oxygen or hydrogen.

The term substantially spherical in this context means that the shape of the light-weight pressure container is similar to a sphere but does not have to have a mathematically precise three-dimensional shape with a uniform radius. This includes e.g., embodiments where the three-dimensional shape is flattened at the poles with a reduced curvature or where a short cylindrical section, e.g. with an axial extension of less than half a radius is provided in an equatorial portion wherein the cylindrical section is short compared to a curvature radius of the spherical wall sections or where a curvature is reduced in the equatorial portion in planes that include the poles compared to the spherical wall sections.

Advantageously the at least one polar or equatorial attachment element is provided in the following steps:

a1) providing an attachment element formwork mold as an external formwork or an internal formwork;

a2) applying the metal material by a spray jet through at least one spray nozzle according to the thermal spraying method onto a mold surface at an inner circumference or outer circumference of the attachment element formwork mold to form at least one attachment section and at least one container wall section;

a3) forming a circumferential edge portion of the container wall section that tapers towards the free circumferential edge and that includes a contact surface that extends at a slant angle in a cross section;

a4) separating the attachment element from the attachment element formwork mold.

According to this embodiment of the method according to the invention the production of the at least one polar or equatorial attachment element is performed by the thermal spray method in or on a formwork mold so that the advantages described supra can be obtained.

Advantageously the contact surface that extends at a slant angle in the cross section is machined after removing the attachment element from the attachment element mold instead, e.g; in a chipping manner in order to provide a flat and smooth surface of the contact surface.

Another embodiment of the method according to the invention that is combinable with other embodiments is characterized in that features of the spray jet of the at least one spray nozzle are adjusted when the spray jet moves from the contact surface that extends at a slant angle in cross section and impacts the mold surface where no material has been applied yet through the thermal spray method yet and wherein the characterizing features of the spray jet are reset again when the spray jet moves from the mold surface where no material has been applied yet by the thermal spray method and impacts the contact surface that extends at a slant angle in cross section. This change of characteristic features of the spray jet, e.g; of the impact velocity of the metal material particles and/or of the impact angle on the surface achieves that a strong and firm material connection is provided at the surface that is formed by the material of the contact surface in the portion of the wall section, thus the contact surface that extends at a slant angle, whereas no strong and firm material connection at the surface that is formed by the material of the mold surface or of a release agent arranged thereon is provided where the spray jet impacts the mold surface from which the work piece, thus e.g; the container wall section has to be disengaged again so that the finished work piece can be separated from the formwork mold more easily.

It is advantageous for all embodiments of the method according to the invention when a thermal and/or mechanical treatment at least of the container wall element is performed after finishing the unit including the at least one attachment element and the container wall element. This thermal treatment causes structural changes of the metal material in the work piece produced by the additive method according to the invention wherein the structural changes improve toughness of the material and make the material more elastic.

In a particularly advantageous embodiment of the method according to the invention the finished light-weight pressure container is enveloped with a jacket made from fiber composite material at least in a portion of its container wall. Thus, the metal light-weight pressure container can perform the task of tightly enclosing the medium stored therein while the jacket made from the fiber composite material improves mechanical properties and provides the required stability to react the pressure forces that are imparted from the inside upon the metal wall skin of the light-weight pressure container.

Thus, it is particularly advantageous for weight saving when the light-weight pressure container is made from a carbon fiber composite material or includes this material at least in the jacket that envelops the container wall.

The invention also relates to a light-weight pressure container that is produced by the method according to the invention in particular with a seamless container wall that is produced by the thermal spraying method.

BRIEF DESCRIPTION OF THE DRAWINGS

Advantageous embodiments of the invention with additional features and advantages are subsequently described in more detail with reference to the appended drawing figure, wherein.

DETAILED DESCRIPTION OF THE INVENTION

Figure 1:
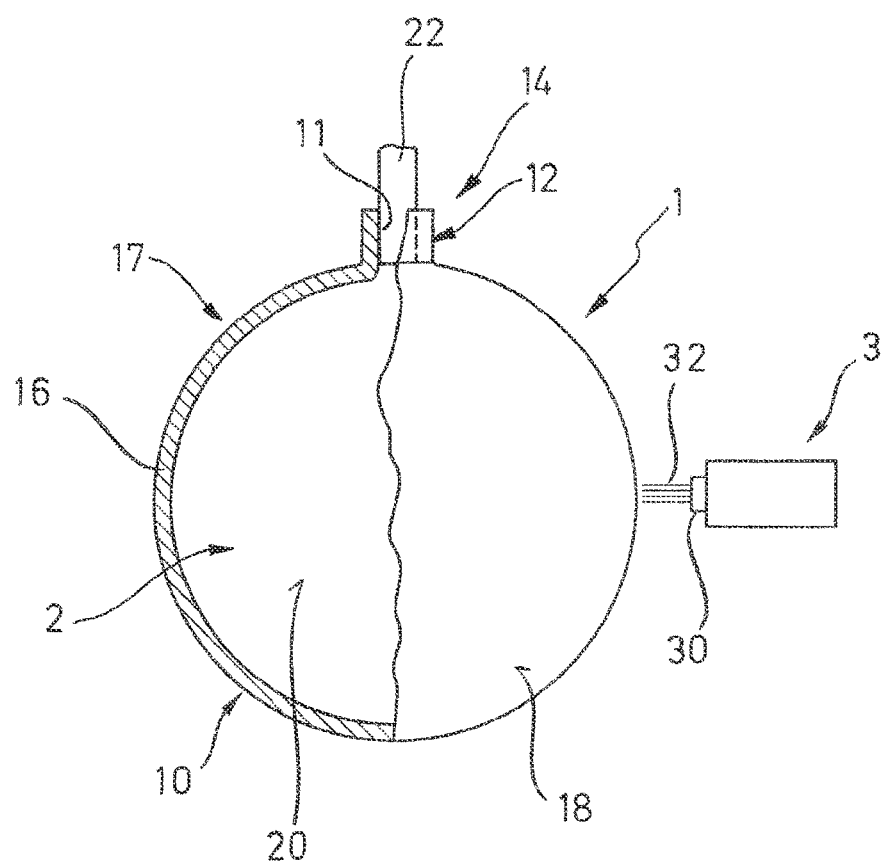
FIG. 1 illustrates a partial sectional view of a substantially spherical light weight pressure container of a light weight pressure tank according to a first embodiment of the invention.

FIG. 1. Illustrates a partially cut substantially spherical lightweight pressure container 1 formed as a spherical three-dimensional body 10 that is provided with a spout 12 that forms a polar attachment element 14. The lightweight pressure container 1 is fabricated by an additive thermal spraying method, in the illustrated embodiment integrally with a uniform spherical wall 16 of the three-dimensional body 10.

FIG. 1 also illustrates how a thermal spraying device 3 is positioned in front of a mold surface of a formwork mold 2 and how the spraying device operates. The spraying device 3 can be attached e.g. at a robotic arm. A spray jet 32 exits from a spray nozzle 30 of the thermal spraying device 3, wherein the spray jet is directed onto the mold surface 20 of the formwork mold 2. The spray jet 32 is made from a high velocity gas jet that is provided with particles of a metal material in the spraying device 3. The gas jet with the metal particles included therein is accelerated in a known manner by a Laval nozzle to reach supersonic speed so that the metal particles impact the mold surface 20 or the release agent layer provided thereon with very high kinetic energy. Moving the spraying device 3 that includes the spray nozzle 30 parallel to the mold surface 20 of the mold 2 along lines of longitude and lines of latitude and optionally also in a circumferential direction deposits the metal material on the mold surface 20 of the formwork mold 3 advantageously in layers essentially in a homogenous manner.

Thus, the metal material is advantageously applied in layers onto a convex cambered surface of a spherical or substantially spherical formwork mold 2 that forms a mold surface 20 through the spray jet 32 exiting the at least one spray nozzle 30 of the spraying device 3. The formwork mold 2 defines an inner volume of the lightweight pressure container 1. A cylindrical mold core 22 that is applied to the spherical or substantially spherical formwork mold 2 defines an opening 11 of the lightweight pressure container 1 that is enveloped by the cylindrical polar spout 12 that is integrally configured in one piece with the spherical wall 16 of the three-dimensional body 10 that forms a container wall element 17 using the additive fabrication method.

Thus, also plural openings and/or spouts can be provided which can also be used for attaching the lightweight pressure container 1. The spherical or substantially spherical formwork mold 2 is broken and/or melted after producing the spherical three-dimensional body 10 and leftovers are removed through the opening 11 after removing the mold core 22. This lightweight pressure container 1 with the spherical three-dimensional body 10 can be used e.g. for a satellite tank.

After finishing the lightweight pressure container 1, it can be treated thermally and/or mechanically in order to influence the properties of the metal material applied by the additive method and to adapt in particular the spout 12 and the container wall 16 of the spherical three-dimensional body 10 to a particular application. An outer surface 18 of the lightweight pressure container 1 can be compressed e.g. by bead blasting.

Figure 2:
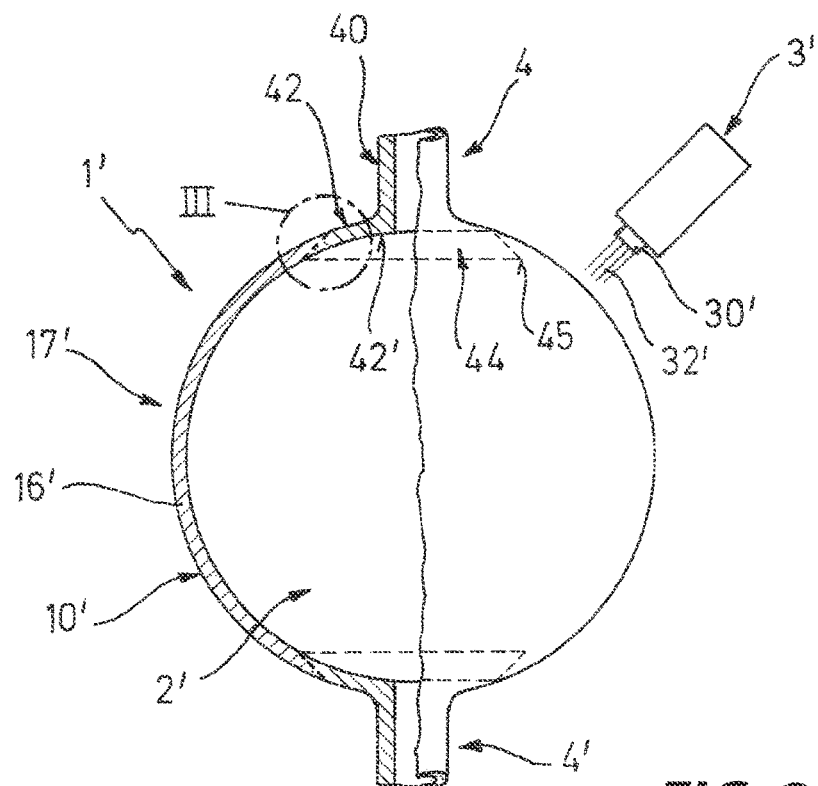
FIG. 2 illustrates a partial sectional view of a substantially spherical lightweight pressure container of a lightweight pressure tank according to a second embodiment of the invention.

An alternative embodiment of a spherical lightweight pressure container 1' for a lightweight pressure tank according to the invention is illustrated in FIG. 2. This lightweight pressure container 1' is provided with an upper polar attachment element 4 and a lower polar attachment element 4' that can be configured essentially identical. Thus, only the upper polar attachment element 4 will be subsequently described.

The polar attachment elements 4, 4' have been preproduced in a separate fabrication step. They can be produced either conventionally by master forming and/or by chipping machining or they can also be fabricated by an additive fabrication method. The respective polar attachment element 4, 4' includes an attachment section 40 that essentially corresponds to the spout 12 of the embodiment in FIG. 1 and a container wall section 42. The container wall section 42 forms a pole cap of the spherical or substantially spherical lightweight pressure container 1' and is thus configured cambered accordingly. The concave camber of the radial inner surface 42' of the container wall section 42 corresponds to the convex camber of the mold surface 20 of the spherical or substantially spherical mold 2 in the respective polar area.

Figure 3:
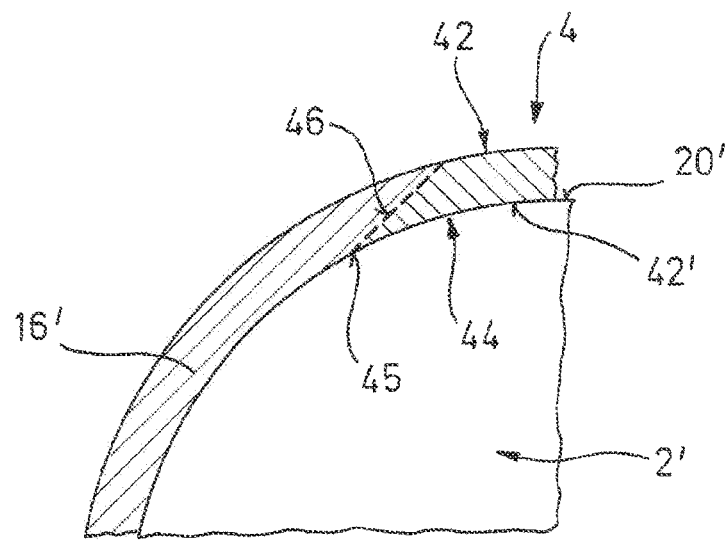
FIG. 3 illustrates a blown-up view of detail III of FIG. 2.

The container wall section 42 of the polar attachment element 4 includes a circumferential edge portion 44 that is illustrated in FIG. 2 by two respective dashed lines. In this circumferential edge portion 44 a wall thickness of the container wall section 42 is reduced towards the free circumferential edge 45 of the container wall section 42 as evident from FIG. 3. Thus, a contact surface 46 that extends at a slant angle in a cross-section is formed on a side of the container wall section 42 that is oriented away from the mold surface 20 of the formwork mold 2, wherein the contact surface 46 envelops and defines the container wall section 42 in an annular manner.

After applying the polar attachment element 4, 4' to the spherical or substantially spherical formwork mold 2' metal material is applied to the contact surface 46 of the attachment element 4, 4' and to the mold surface 20' of the cambered formwork mold 2' by a spray jet 32' that exits from the spray nozzle 30' of the spraying device 3', wherein the spraying device 3' moves over the mold surface 20' of the cambered formwork mold 2'. This forms the spherical container wall 16' of the spherical body 10' adjacent to the container wall section 42 of the attachment element 4 wherein the spherical container wall 16' defines a container wall element 17', wherein a thickness of the spherical container wall 16' of the three-dimensional body 10' corresponds to a thickness of the container wall section 42 measured in a radial direction. Thus, a monolithic connection of the sprayed-on metal material is formed with the advantageously identical metal material of the container wall section 42 in the portion of the contact surface 46 so that no boundary between the container wall section 42 and the spherical wall 16' is detectable anymore after completion which is indicated by the dashed representation of the contact surface 46 in FIG. 3.

Figure 4:
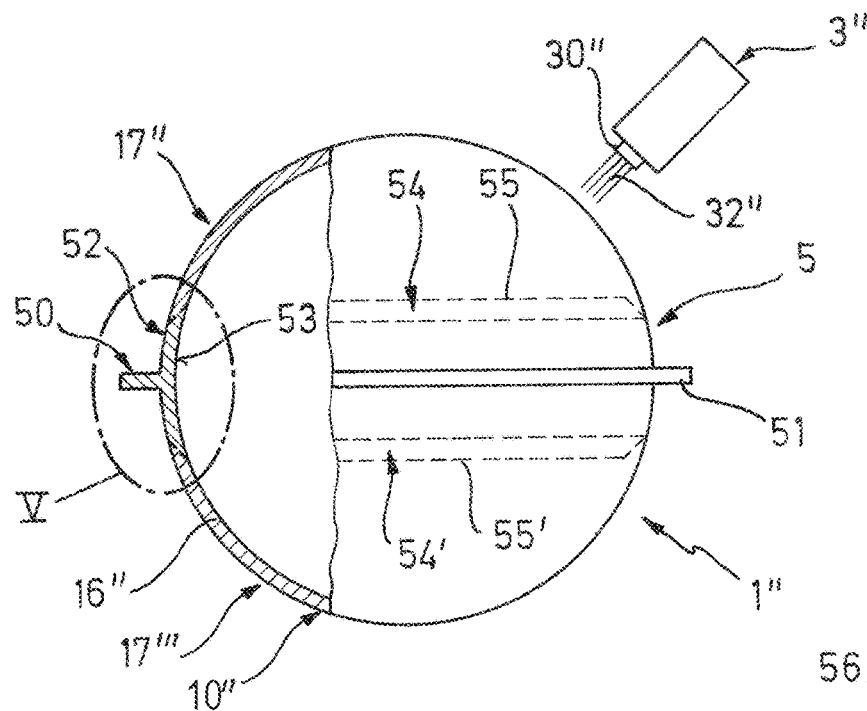
FIG. 4 illustrates a partially cut substantially spherical lightweight pressure container of a lightweight pressure tank according to a third embodiment of the invention.
Figure 5:
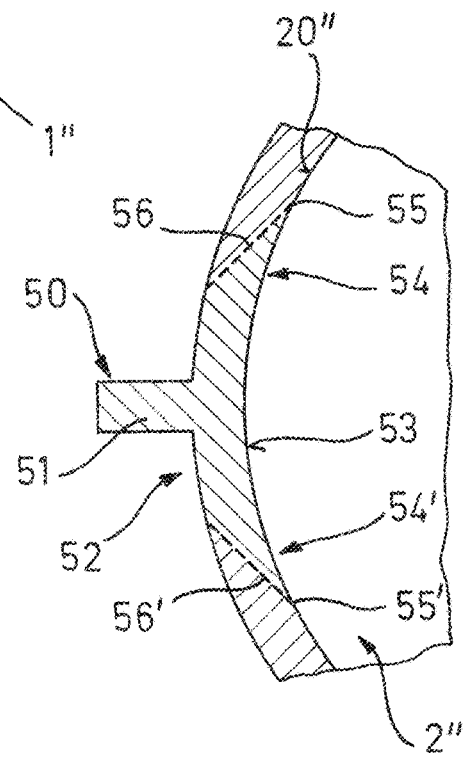
FIG. 5 illustrates a blown-up detail V of FIG. 4.

FIG. 4 illustrates another alternative embodiment of a lightweight pressure container 1" produced according to the invention for a lightweight pressure tank that includes an equatorial attachment element 5. The equatorial attachment element 5 includes an attachment section 50 that is formed by a circumferential or interrupted radially outward protruding annular flange 51 and an annular container wall section 52. The container wall section 52 is configured slightly cambered in a vertical sectional view, wherein a radially inner surface 53 that is oriented away from the annular flange 51 has a slightly concave camber that only approximately corresponds to the convex camber of the mold surface 20" of the formwork mold 2" and allows placing the equatorial attachment element 5 onto the formwork mold 2". The wall thickness of the container wall section 52 is constant besides the circumferential portions so that the radially outer surface of the container wall section 52 is also cambered accordingly as illustrated in the blown-up representation of FIG. 5. The radially inner surface 53 of the container wall section, however, can also be cylindrical in order to facilitate placement onto the formwork mold 2" that is also cylindrical in this portion.

The equatorial attachment element 5 can also be divided horizontally in order to facilitate placement of the two halves onto the formwork mold from above and from below, wherein two halve shells of the lightweight pressure container 1' are produced which can be joined later.

The circumferential container wall section 52 includes an upper circumferential edge portion 54 and a lower circumferential edge portion 54' whose wall thickness tapers towards the respective free circumferential edge 55, 55' forming a slanted contact surface 56, 56' in the respective cross-section.

The equatorial attachment element 5 can be produced either conventionally by master forming or by chipping machining or it can also be produced by an additive fabrication method.

After applying the equatorial attachment element 5 to the spherical or substantially spherical formwork mold 2" the metal material is applied to the respective contact surface 56, 56' of the attachment element 5 and to the adjoining portion of the mold surface 20' of the cambered formwork mold 2" by the spray jet 32" that exits from the spray nozzle 30" of the spraying device 3" wherein the spraying device 3" moves over the mold surface 20" of the cambered formwork mold 2". Thus, an upper container wall element 17" or a lower container wall element 17'" is formed adjacent to the respective container wall section 52 of the attachment element 5 wherein the upper container wall element and the lower container wall element jointly form the spherical wall 16" of the three-dimensional body 10" wherein the thickness of the spherical wall 16" of the three-dimensional 10" corresponds to the thickness of the container wall section 52 measured in the radial direction. This forms a monolithic connection of the sprayed-on metal material with the advantageously identical metal material of the container wall section 52 in the portion of the respective contact surface 56, 56' so that no boundary between the container wall section 52 and the spherical wall 16" is detectable anymore after completion which is visualized by the dashed representation of the respective contact surface 56, 56' in FIG. 5.

Figure 6:
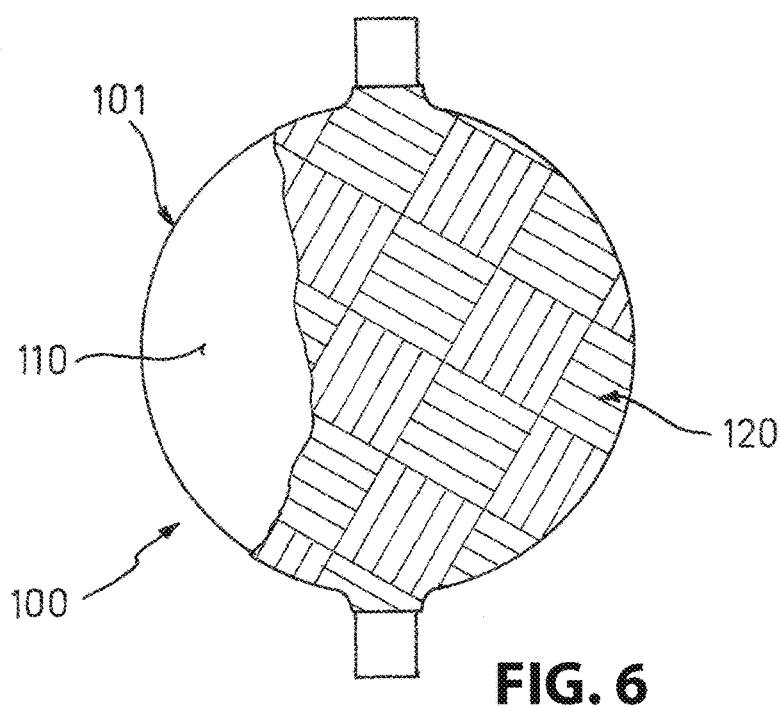
FIG. 6 illustrates a view of a lightweight pressure container with a partially cut jacket made from a fiber composite material.

FIG. 6 illustrates a lightweight pressure tank 100 according to the invention with a lightweight pressure container 101 with polar attachment elements as illustrated e.g. in FIG. 2, wherein the outer surface 110 of the lightweight pressure container 101 is enveloped by a jacket 120 made from wound fiber composite material, e.g. carbon fiber reinforced composite material in order to give increased mechanical stability to the lightweight pressure tank 100.

Reference numerals in the drawings are merely used for illustration purposes to improve comprehension of the invention and do not limit the spirit or the scope of the invention.

REFERENCE NUMERALS AND DESIGNATIONS 1 light-weight pressure container
1' light-weight pressure container
1" light-weight pressure container
2 formwork mold
2' formwork mold
2" formwork mold
3 spraying device
4 polar attachment element
4' polar attachment element
5 equatorial attachment element
10 spherical three-dimensional body
10' spherical three-dimensional body
11 opening
12 spout
14 polar attachment element
16 spherical wall
16' spherical wall
17 container wall element
17' container wall element
17" container wall element
17'" container wall element
18 outer surface
20 mold surface
20' mold surface
20" mold surface
22 cylindrical mold core
30 spray nozzle
30' spray nozzle
30" spray nozzle
32 spray jet
32' spray jet
32" spray jet
40 Attachment section
42 container wall section
42' inner radially surface of the container wall section 42
44 circumferential edge portion
46 contact surface
51 annular flange
52 annular container wall section
53 radially inner surface
54 upper circumferential wall portion
54' lower circumferential wall portion
55 circumferential edge
55' circumferential edge
56 contact surface
56' contact surface
100 lightweight pressure tank
101 light-weight container
110 outer surface
120 jacket

What is claimed is:

1. A method for producing a light-weight pressure tank with a light-weight pressure container from a metal material, the light weight pressure container including at least one polar or equatorial attachment element and a container wall connected to the at least one polar or equatorial attachment element,
wherein at least the container wall is formed integrally in one piece with the at least one polar or equatorial attachment element by additive manufacturing by a thermal spraying method by applying the metal material to a convex or concave mold surface of a cambered formwork mold by a spray jet through at least one spray nozzle, the method comprising:
providing the at least one polar or equatorial attachment element that includes at least one attachment section and at least one container wall section, wherein the at least one container wall section includes at least one circumferential edge portion whose wall thickness tapers towards a free circumferential edge and forms a contact surface that extends at a slant angle in a cross section of the at least one container wall section;
positioning the at least one polar or equatorial attachment element at or on the convex or concave mold surface of the cambered formwork mold so that the contact surface Is oriented away from the convex or concave mold surface;
applying the metal material by the spray jet through the at least one spray nozzle by the thermal spraying method to the contact surface of the at least one attachment element and to the convex or concave mold surface of the cambered formwork mold and forming a cambered container wall element that is connected seamlessly to the contact surface and that is integrally configured in one piece with the container wall section; and separating a light-weight pressure tank unit including the at least one attachment element and the container wall element from the cambered formwork mold.

2. The method according to claim 1, wherein the light-weight pressure container includes a spherical or substantially spherical three-dimensional body which is produced in a seamless manner by applying the metal material by the spray jet through the at least one spray nozzle to a convex outer surface or concave inner surface of the cambered formwork mold that forms the convex or concave mold surface, wherein the cambered formwork mold is spherical or substantially spherical.

3. The method according to claim 1, providing the at least one polar or equatorial attachment element including:
providing the formwork mold as an outer or inner attachment element mold;
applying the metal material by the spray jet through the at least one spray nozzle by the thermal spraying method to the convex or concave mold surface at an inner circumference or an outer circumference of the attachment element mold to form the at least one attachment section and the at least one container wall section
forming the at least one circumferential edge section of the at least one container wall section that tapers towards the free circumferential edge and that includes the contact surface that extends at the slant angle in the cross section, and
separating the at least one polar or equatorial attachment element from the attachment element mold.

4. The method according to claim 3, further including: mechanically processing the contact surface that extends at the slant angle in the cross section after removing the at least one polar or equatorial attachment element from the attachment element mold.

5. The method according to claim 1, further comprising:
adjusting characteristic properties of the spray jet of the at least one spray nozzle when moving the spray jet from the contact surface that extends at a slant angle in the cross section so that the spray jet impacts the convex or concave mold surface where no metal material has been applied yet by the thermal spraying method; and
readjusting the characteristic properties of the spray jet when moving the spray jet from the convex or concave mold surface where no metal material had been applied yet by the thermal spraying method so that the spray jet impacts the contact surface that extends at the slant angle in the cross section.

6. The method according to claim 1, further comprising: performing a thermal or mechanical treatment at least of the container wall element after completing the unit including the at least one polar or equatorial attachment element and the container wall element.

7. The method according to claim 1, further comprising: enveloping the light weight pressure container with a jacket made from a fiber composite material at least in a portion of the container wall.

8. The method according to claim 7, wherein the jacket is made from a carbon fiber composite material or includes the carbon fiber composite material.

9. A spherical light weight metal pressure tank produced according to the method according to claim 1, the spherical light weight metal pressure tank comprising:
a metal container wall with a seamless metal structure;
at least one polar or equatorial metal attachment element bonded to the metal container wall,
wherein the metal container wall is formed integrally in one piece with the at least one polar or equatorial metal attachment element,
wherein the at least one polar or equatorial metal attachment element includes at least one attachment section and at least one container wall section,
wherein the at least one container wall section includes at least one circumferential edge portion whose wall thickness tapers towards a free circumferential edge and forms a contact surface that extends at a slant angle in a cross section of the at least one container wall section,
wherein the at least one polar or equatorial metal attachment element is positioned so that the contact surface is oriented away from a center of the spherical light weight metal pressure tank,
wherein a cambered container wall element is bonded seamlessly to the contact surface and is integrally configured in one piece with the container wall section, and
wherein the metal container wall, the at least one polar or equatorial metal attachment element, the at least one attachment section and the at least one container wall section are made from identical metal.

\* \* \* \* \*